(12) United States Patent
Hamm et al.

(10) Patent No.: US 10,955,819 B2
(45) Date of Patent: Mar. 23, 2021

(54) CONTROL METHOD FOR THE MOVEMENT OF A TOOL AND CONTROL DEVICE

(71) Applicant: SIEMENS AKTIENGESELLSCHAFT, Munich (DE)

(72) Inventors: Carsten Hamm, Eggolsheim (DE); Florian Nikolaus Lorenz, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 270 days.

(21) Appl. No.: 15/754,730

(22) PCT Filed: Jun. 17, 2016

(86) PCT No.: PCT/EP2016/064021
§ 371 (c)(1),
(2) Date: Feb. 23, 2018

(87) PCT Pub. No.: WO2017/032474
PCT Pub. Date: Mar. 2, 2017

(65) Prior Publication Data
US 2018/0239337 A1 Aug. 23, 2018

(30) Foreign Application Priority Data

Aug. 24, 2015 (EP) .................................. 15182171

(51) Int. Cl.
*G06F 19/00* (2018.01)
*G05B 19/4093* (2006.01)
(Continued)

(52) U.S. Cl.
CPC ....... *G05B 19/40937* (2013.01); *B23Q 15/08* (2013.01); *B23Q 15/14* (2013.01);
(Continued)

(58) Field of Classification Search
CPC .. B23Q 15/08; B23Q 15/14; G05B 19/40937; G05B 2219/32018; G05B 2219/34175;
(Continued)

(56) References Cited

U.S. PATENT DOCUMENTS 6,311,098 B1 * 10/2001 Higasayama ...... G05B 19/4099
700/159
6,982,536 B2 1/2006 Geissdoerfer et al.
(Continued)

FOREIGN PATENT DOCUMENTS

| DE | 601 23 379 T2 | 1/2007 |
| DE | 10 2013 112 232 B3 | 3/2015 |
| JP | 2007 200037 A | 8/2007 |

OTHER PUBLICATIONS

Qing Zhen Bi et al: "An analytical curvature-continuous Bezier transition algorithm for high-speed machining of a linear tool path"; International Journal of Machine Tools and Manufacture; Elsevier US; Bd. 57; pp. 55-65, XP028519071; ISSN: 0890-6955; DOI:10.1016J.IJMACHTOOLS.2012.01.008.
(Continued)

*Primary Examiner* — Zhipeng Wang
(74) *Attorney, Agent, or Firm* — Henry M. Feiereisen LLC

(57) ABSTRACT

In a control method for the movement of a tool with a machine tool, the machine tool involves a numerically controlled machine tool, in order to produce an arbitrary required surface of a workpiece by machining. A numeric path program is created which describes the machining of the workpiece with the tool at machining points and which controls the control device. The numeric path program produces a path with respect to the geometric nature of the surface of the workpiece to be machined, with the path including a plurality of sample points and individual paths, with each individual path connecting a pair of the sample
(Continued)

points to each other. The numeric path program is evaluated and selected on the basis of a geometric quality criterion, with the geometric quality criterion having continuity as at least one criterion.

7 Claims, 3 Drawing Sheets

(51) Int. Cl.
B23Q 15/08 (2006.01)
B23Q 15/14 (2006.01)
(52) U.S. Cl.
CPC .............. *G05B 2219/32018* (2013.01); *G05B 2219/34175* (2013.01); *G05B 2219/35121* (2013.01); *G05B 2219/45145* (2013.01); *G05B 2219/45165* (2013.01); *Y02P 90/02* (2015.11)
(58) Field of Classification Search
CPC ........... G05B 2219/35121; G05B 2219/45145; G05B 2219/45165; Y02P 90/265
See application file for complete search history.

(56) References Cited

U.S. PATENT DOCUMENTS

| | | | |
|---|---|---|---|
| 7,236,913 B2 | 6/2007 | Hamm et al. | |
| 7,299,108 B2 | 11/2007 | Geissdoerfer et al. | |
| 8,909,371 B2 | 12/2014 | Hamm | |
| 8,978,503 B2 | 3/2015 | Dort et al. | |
| 9,555,546 B2 | 1/2017 | Hamm et al. | |
| 9,859,870 B2 | 1/2018 | Geissdoerfer et al. | |
| 2003/0200005 A1* | 10/2003 | Hirai | G05B 19/4103 700/187 |
| 2004/0030418 A1 | 2/2004 | Hamm et al. | |
| 2005/0246052 A1* | 11/2005 | Coleman | G05B 19/40937 700/188 |
| 2011/0190922 A1* | 8/2011 | Walker | B24B 13/06 700/118 |
| 2013/0151000 A1* | 6/2013 | Mackman | G05B 19/4097 700/186 |
| 2013/0160143 A1 | 6/2013 | Hamm et al. | |
| 2015/0355647 A1 | 12/2015 | Bitterolf et al. | |

OTHER PUBLICATIONS

PCT International Search Report and Written Opinion of International Searching Authority dated Jul. 22, 2016 corresponding to PCT International Application No. PCT/EP2016/064021 filed Jun. 17, 2016.

Shahzadeh, Abbas et al:, "Path Planning for CNC Machines Considering Centripetal Acceleration and Jerk". 2013 IEEE International Conference on Systems, Man, and Cybernetics. pp. 1759-1764.

* cited by examiner

CONTROL METHOD FOR THE MOVEMENT OF A TOOL AND CONTROL DEVICE

CROSS-REFERENCES TO RELATED APPLICATIONS

This application is the U.S. National Stage of International Application No. PCT/EP2016/064021, filed Jun. 17, 2016, which designated the United States and has been published as International Publication No. WO 2017/032474 and which claims the priority of European Patent Application, Serial No. 15182171.7, filed Aug. 24, 2015, pursuant to 35 U.S.C. 119(a)-(d).

BACKGROUND OF THE INVENTION

The invention relates to a control method for the movement of a tool by means of a machine tool in order to produce an arbitrary desired surface by machining, comprising a numerically controlled machine tool, wherein the numeric path program, which describes the machining of the workpiece by means of the tool at the machining points, is produced in order to control the machine tool by means of a control device, and wherein the path consists of a plurality of sample points and individual paths and each individual path connects a pair of sample points to each other, and wherein the machine tool is controlled in accordance with the produced path. The invention further relates to a control device.

Workpieces that are to be produced on a CNC machine are mostly constructed in Computer-Aided Design (CAD). Any given components are often composed of a larger number of geometry elements. The transitions are designed as required and are either geometrically smooth or explicitly not smooth (edges, corners, phases etc.). It is precisely in the first category, namely the geometrically smooth transitions, that there are large differences in quality, which are attributable in part to basic weaknesses of the software itself, in part to incorrect operation, for example the construction of the workpiece.

For machine production the geometrical description in the steps Computer-Aided Manufacturing (CAM) and Post Processor (PP) is transferred into a CNC path program. In its path programming of the workpiece, the CNC path program, as well as necessary control information as important information, contains the positioning commands for the production process at the machine tool.

In CAM the basic strategy for machining is defined, i.e. the form and the sequence in which the tool (e.g. a milling tool) is guided over the material. This can for example be in the form of a zig-zag or in a spiral form etc. Further developments increase the productivity of the machine by considering the amount of swarf currently being formed. A higher yield of "swarf per advance", i.e. the volume removed per length of tool path, is obtained by specially generated tool paths.

SUMMARY OF THE INVENTION

The underlying object of the invention is to specify a method improved in respect of surface quality and processing result for a machine tool, in particular for a milling machine. A further object lies in the specification of such a device.

The object related to method is achieved by the specification of a control method for the movement of a tool with a machine tool for creating an arbitrary required surface by machining comprising a numerically controlled machine tool, wherein the numeric path program, which describes the processing of the workpiece with the tool at the processing points, is created for control of the machine tool by a control device, and wherein the path consists of a number of sample points and individual paths and each individual path connects a pair of sample points to one another, and wherein the machine tool is controlled in accordance with the produced path, wherein the path program for control of the machine tool is evaluated and selected on the basis of a geometric quality criterion, and wherein the geometric quality criterion comprises the continuity at least as one criterion, so that the path program creates the path with respect to the geometric nature of the workpiece to be machined.

The object related to the device is achieved by the specification of the control device for the movement of a tool with a machine tool for producing a required arbitrary surface by machining comprising a numerically controlled machine tool, wherein the numeric path program, which describes the processing of the workpiece with the tool at the processing points, is created for control of the machine tool by a control device, and wherein the path consists of a number of sample points and individual paths and each individual path connects a pair of sample points to one another, wherein the path program for control of the machine tool is able to be evaluated and selected on the basis of a geometric quality criterion, and wherein the geometric quality criterion comprises the continuity at least as one criterion, so that the path is able to be produced by the path program with respect to the geometric nature of the workpiece to be machined.

In this case a path program relates to a very wide range of applications. One option is to let a free-form surface of a body be produced through the path program by means of a tool. The body in this case can also be moved itself, so that the course of the path of the tool is different from the free-form surface of the workpiece or from the contours of the workpiece. An example in which the workpiece also moves is with lathes. Processing machines which also at least mill or grind are also able to be designed with axes of rotation, wherein here too the inventive advantages are able to be used. The invention can also be usable with laser machining/laser cutting and methods for applying materials etc.

The CNC controller must move down the generated path of the machine tool. Often however the paths have features, which as a result of practical restrictions, cannot be implemented without difficulty.

The quality of the cutting profile actually left behind during removal of material depends to a large extent on the quality of the path geometry and other properties. The way in which the transitions from an individual path to the next are designed determines whether the machine can follow the transition well or badly. The mathematically relevant features are above all the continuity or the ability to differentiate between the individual path sections. The "good nature" of the path being moved down by a CNC-controlled machine tool increases with the order of the continuity.

A CNC-controlled machine tool can basically move to all transitions (anywhere). Depending on the desired strategy, this results however in a violation of the geometry, such as e.g. rounding or overgrinding, to a variation of the dynamics such as e.g. braking or acceleration, or to a combination of the two. The first means curtailments in the surface precision, the second means unevenness in the machine movement and thus the mapping of the machine dynamic to the workpiece. Oscillations are to be mentioned in this context for example. In accordance with the invention the generated path will now be oriented to the geometrical quality, especially of the surface. To this end a quality criterion is needed, which can establish the properties of the surfaces or of the tracks reliably, numerically stably and in a high-performance manner. The criterion of continuity is employed first of all to establish a measure of evaluation.

I.e. the path program for controlling the machine tool is produced and, on the basis of at least the continuity, the path produced by the path program is evaluated and selected. One and the same geometric feature in this case can have continuity, moved through in one direction, and not in another direction. Preferred directions are produced for corresponding individual paths. The individual paths of the processing are now selected so that the preferred directions established are used where possible to produce the workpiece.

Therefore, in accordance with the invention, a differential-geometric property of the workpiece surface is included in the processing strategy, in particular in a milling strategy here. This makes possible a milling strategy that can be executed in the optimum possible way by the machine. Paths arise that are especially favorable for processing in the CNC machine, and which mean the least possible excitation for the machine dynamics. The processing result is the best possible as regards the surface quality and precision.

The subclaims list further advantageous measures, which can be combined arbitrarily with each other in order to achieve further advantages.

Advantageously a number of path programs are created for a predetermined required surface and are evaluated and selected with respect to the geometric quality criterion. The geometric quality criterion can also comprise, as an additional criterion, the tangency continuity (G1 continuity). In addition the geometric quality criterion can also comprise, as an additional criterion, the curvature continuity (G2 continuity).

The geometric quality criterion preferably comprises both the criterion for the curvature continuity and also the criterion for the tangency continuity, wherein a combination tool calculates, evaluates and selects the path program for controlling the machine tool on the basis of a suitable combination of these criteria. This is above all the case when the path has sections with curvature continuity and sections with tangency continuity.

This means that the path programming of the machine tool is done in arbitrary ways. Two (or more) variants are then analyzed and evaluated in respect of their geometric nature. The better-suited variant in each case is given priority and will be used for manufacturing. To establish a measure for evaluation in such cases the various criteria, i.e. continuity, G1 continuity and G2 continuity can be calculated and combined in a suitable way, e.g. average value, maximum etc.

In a preferred embodiment the geometric quality criterion also comprises, as an additional criterion, the characteristics of the machine tool. I.e. the evaluation also includes characteristics of the actual machine tool, e.g. the different dynamic capability of individual machine axes. The evaluation of a path program can deliver different results for different machines. This thus allows the most favorable combination of workpiece and machine to be found. Further characteristics are for example the minimum, average and maximum speeds of advance that occur during the execution of the path program, the minimum, average and maximum speeds of the machine axes that occur during the execution of the path program, the minimum, average and maximum accelerations of the machine axes that occur during the execution of the path program, the minimum, average and maximum power consumption (thus also the force or torque consumption) that occur during the execution of the path program, the maximum speed of change (temporal derivation) of the power consumption of the motor of the respective machine axis, the average spindle speed (required value and actual value) that occurs during the execution of the path program, the minimum, average and maximum torque of the spindle, the maximum speed of change (temporal derivation) of the spindle torque and also for example the processing duration.

Of course the geometric quality criterion can include both the criterion of the curvature continuity and the criterion of the tangency continuity and also the criterion of the characteristics, wherein a combination tool calculates, evaluates and then selects the path program for controlling the machine tool on the basis of a suitable combination of these criteria. This enables an even better execution of the path program to be achieved for example and/or a better quality of the surface to be expected, and/or a shorter working time etc. This is above all relevant for paths that have sections that are curvature continuous and sections that are tangency continuous.

Preferably the path comprises various individual paths. Each individual path is evaluated in accordance with the geometric quality criterion.

In such cases the evaluations of the various individual paths can also be weighted for example, in order to create a suitable path program.

In a preferred embodiment the geometric quality criterion is the curvature continuity (G2 continuity), wherein the individual path selected in accordance with the geometric quality criterion has a preferred direction. The path is now selected in the preferred embodiment in accordance with the preferred directions of the individual paths.

In accordance with the invention, in a first step, the workpiece geometry is analyzed and evaluated with respect to its differential-geometric nature. One and the same geometric feature can in this case be G2 continuous, moved through in one direction, and not in another direction. Preferred directions are produced for corresponding individual paths. In a second step the individual paths of the processing are now selected so that the established preferred directions will be used where possible, in order to produce the workpiece.

BRIEF DESCRIPTION OF THE DRAWING

Further features, characteristics and advantages of the present invention emerge from the description given below, which refers to the enclosed figures. In the figures, in schematic diagrams.

DETAILED DESCRIPTION OF PREFERRED EMBODIMENTS

Although the invention has been illustrated and described in greater detail by the preferred exemplary embodiment, the invention is not restricted by the disclosed examples. Variations herefrom can be derived by the person skilled in the art, without departing from the scope of protection of the invention, as is defined by the claims below.

Figure 1:
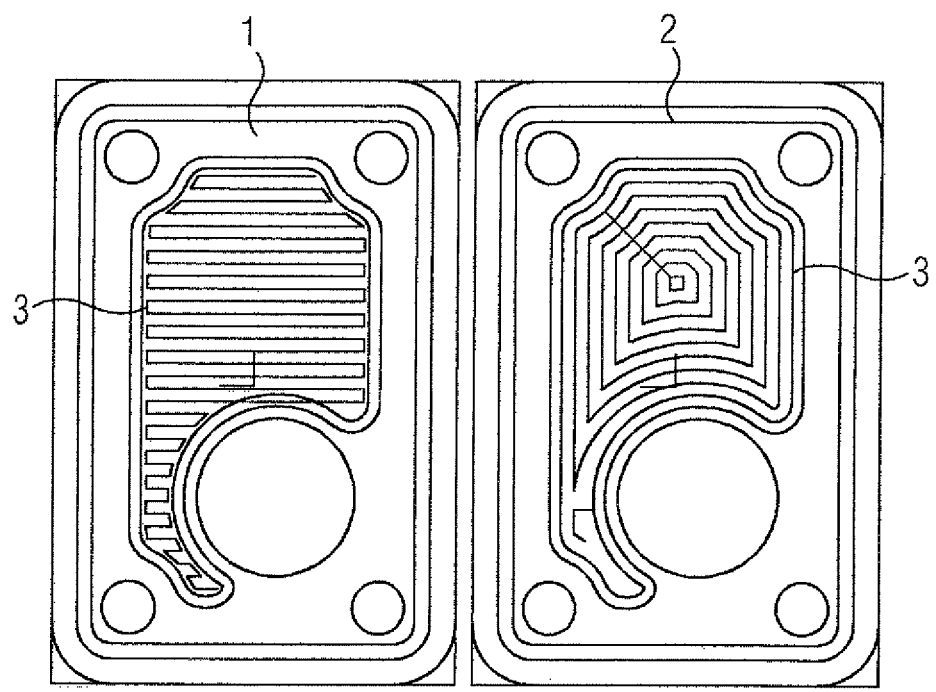
FIG. 1: shows examples for milling paths generated according to the prior art.

In CAM the basic strategy for processing will be defined, i.e. the form and sequence in which the tool (e.g. milling tool) will be guided over the material. Typical examples in FIG. 1 are the 'zig" or "zig-zag" 1 on the left or the spirals 2 on the right. The CNC controller on the machine tool must then move over the generated path 3. Often the paths 3 have features that cannot be implemented without problems because of practical restrictions.

Figure 2:
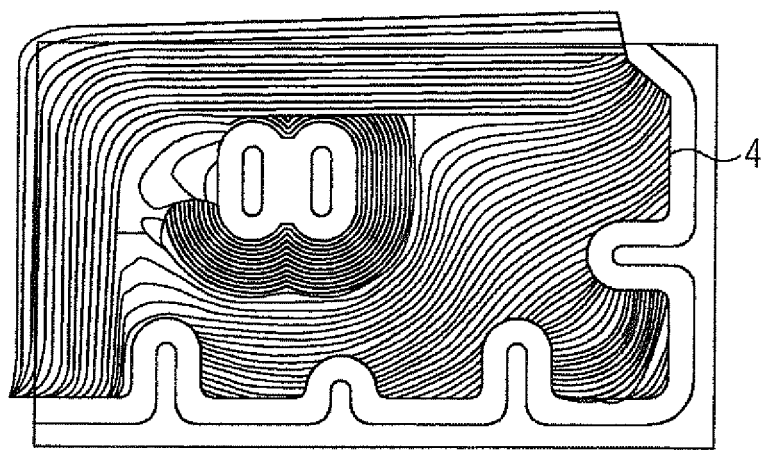
FIG. 2: shows an example of a technology-optimized milling path.

Further developments increase the productivity of the machine by considering the amount of swarf currently being formed. A higher yield of "swarf per advance", i.e. the volume removed per length of tool path, is obtained by specially generated tool paths. FIG. 2 shows an example for a technology-optimized milling path 4 that has been created by means of standard software.

The present invention describes an innovative concept for selection of milling paths. This is geometrically motivated and allows optimal movement by the NC-controlled machine tools.

It has been recognized that the quality of the cutting profile actually left behind during removal of material depends to a great extent on the quality of the path geometry. The way in which the transitions from the individual path to the next individual path are embodied determines whether the machine can follow the transition well or badly. The mathematically-relevant features are the continuity or the ability to differentiate between the individual paths or between the path sections. In such cases the order of continuities logically builds on one another. One stage requires the respective lower stage, i.e. the G1 continuity absolutely requires the G0 continuity. The "good-naturedness" of the path to be moved down by the CNC-controlled machine increases with the order of continuities.

- G0 continuous: The individual paths adjoin each other geometrically, i.e. there is no offset between the end of the previous individual path and the beginning of the next individual path. The transition might very well have a knick (change of direction) however.
- G1 continuous: The individual paths adjoin each other "tangency-correctly", i.e. the direction of the previous section and the direction of the following section match. Such a transition can be moved through without altering speed.
- G2 continuous: The individual paths adjoin each other "curvature-correctly", i.e. the curvature of the previous section and the curvature of the following section match. Such a path can be moved through without any change in acceleration.

In accordance with the invention the path is now evaluated and selected on the basis of the geometric quality of the surface. To do this the characteristics will establish the surface in relation to the paths reliably, numerically-stably and in a high-performance manner.

For this a path program, which describes the path with respect to the geometric nature of the surface of the workpiece to be machined, is created and subsequently evaluated and selected on the basis of the geometric quality criterion, wherein the geometric quality criterion comprises the continuity as at least one criterion.

In accordance with the invention the path programming of the workpiece is done in arbitrary ways. Two or more variants are then analyzed and evaluated with respect to their geometric nature. The better suited in each case is given priority and is used for production. To establish a measure of evaluation the criteria of continuity, tangency continuity and curvature continuity can be combined, calculated and combined in a suitable way, e.g. average value, maximum.

The geometric quality criterion can also include characteristics of the actual machine tool, e.g. the different dynamic capabilities of individual machine axes. The evaluation of a path program can therefore deliver different results for different machines. This thus allows the most favorable combination of workpiece and machine to be found.

Also for example only the G2 continuity can be taken into consideration as the geometric quality criterion. Here, in a first step, the workpiece geometry is analyzed and evaluated with respect to its differential-geometric nature. One and the same geometric feature can be G2 continuous, moved through in one direction and not in another direction. Thus preferred directions for corresponding individual paths are produced. In a second step the individual paths of the processing are now selected so that the preferred directions established are used where possible in order to produce the workpiece.

A path program is always composed of a sequence of individual paths. In total these produce the overall production task, that is to say the geometry to be produced. The prior art knows diverse strategies for how the geometry with individual paths is to be constructed in CAD. It has not been known previously how to incorporate differential-geometric characteristics of the workpiece surface into the milling strategy. This makes possible a milling strategy that can be executed as optimally as possible by the machine. Paths are produced that are especially favorable for machining in NC and which mean the smallest excitation for the machine dynamics. The result of the machining is the best possible with an eye to surface quality and accuracy.

Examples of algorithms for determining the differential-geometric characteristics of a surface will be described in greater detail below, on the basis of which such a path program can be produced.

To this end a surface transition (not shown) through a "last" point p1 on a first surface F and a "first" point P2 on a second surface G is identified (not shown). In order to classify a surface transition in differential-geometric terms it is necessary to consider the corresponding points p1, p2 of the two surfaces F, G. These are obtained from the intersection of both surfaces F, G with an auxiliary plane, which is produced by the current milling direction and the surface normals.

G0 continuity: To test for G0 continuity, the norm of the difference of the two points, i.e. vectors in R_3, is considered.

The following applies:

$$|p1-p2|<\varepsilon$$

if the difference between the two points p1, p2 is below a threshold ε then the transition can be seen as having G0 continuity.

G1 continuity testing requires G0 continuity, therefore the following can be assumed below without restricting general applicability $$p1=p2=p$$

So that a surface transition at a point p has G1 continuity, the corresponding tangency planes of the surfaces F and G must be identical. Each of the two surfaces F, G possesses two derivation vectors at point P in each case, namely in each case the first derivation in the parameter direction that the tangency planes span, and which because of the different parameterizations of the surfaces F and G in length and direction can vary greatly. The two derivation vectors for the so-called Jacobi matrix J. There thus remains to be tested whether there is a possibility of transforming the vector pair of the first surface JF to the vector pair of the second surface JG. Such a transformation X is also called local reparameterization. If there is such a local reparameterization X, then the tangency planes are automatically identical. This is the case if:

$$|J_F - J_G X| < \varepsilon$$

If the columns of the two Jacobi matrixes are normalized before the linear compensating calculation, on the basis of the 2 norm (largest singular value) of the error from the matrix X, the angle α between the two surface normals can be determined as follows:

$$(\alpha = \arcsin |J_F - J_G X|)$$

G2 continuity testing requires G1 continuity. While the direction term is not given any significance in conjunction with the G1 continuity (either there is a knick at the surface transition, but then in any direction via the point or there is smoothness), it plays a central role in the consideration of the G2 continuity. If two potential paths that possess a common point at the surface transition are compared, the concept of the directional G2 continuity will be illustrated in FIG. 3.

Figure 3:
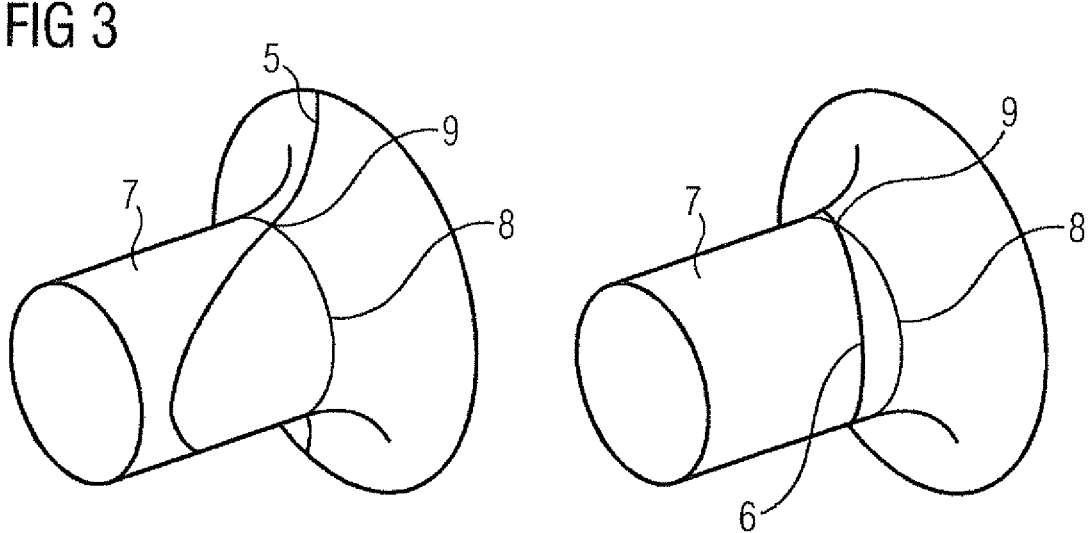
FIG. 3: shows an example for two paths over a constructed surface transition.

In FIG. 3 two potential paths on a workpiece 7, namely a first path as curve 5 and a second path as curve 6, which possess a common point at the surface transition, are compared. While the leading sign of the curvature on the curve in FIG. 3 at the surface transition 8 changes and thus the curvature has a sharp jump, the change of the second derivation of the curve 6 is very small and barely visible. The calculated reparameterization from the GI continuity also appears again during the comparison of the second derivation. A G2 continuity is present, when $$|y^T(H_F - X^T H_G X + J_F \lambda) y| < \varepsilon \text{ with } \lambda \text{ real entry parameter}$$

and wherein y ε $\mathbb{R}$ 2 are a direction on the tangency plane and H the so-called Hessian matrix (=second derivations). All methods presented are based on the calculation of the Moore-Penrose inverses, for which numerous numerically stable methods are known. As a result a value for the curvature jump is obtained for each direction. This is shown in FIG. 4.

Figure 4:
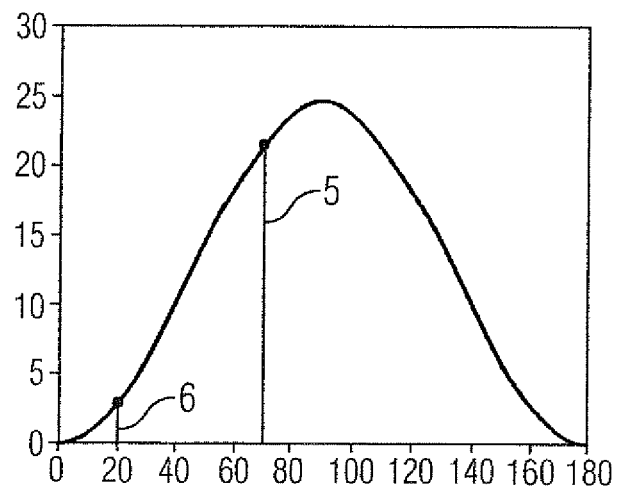
FIG. 4: shows an evaluation of the G2 continuity at a point.

FIG. 4 shows the measure of curvature change (x-axis) on transition from F to G at point 9. When curve 6 is compared with curve 5, it can be recognized that the curve (path) 6 contains the much smaller curvature jump. In addition in FIG. 4 a maximum is to be seen at 90°, which also Indicates that in this direction (90°) the curvature jump would be the most marked. This is Illustrated in FIG. 5 once again. Thus a machining in respect of curve 6 would be selected.

Figure 5:
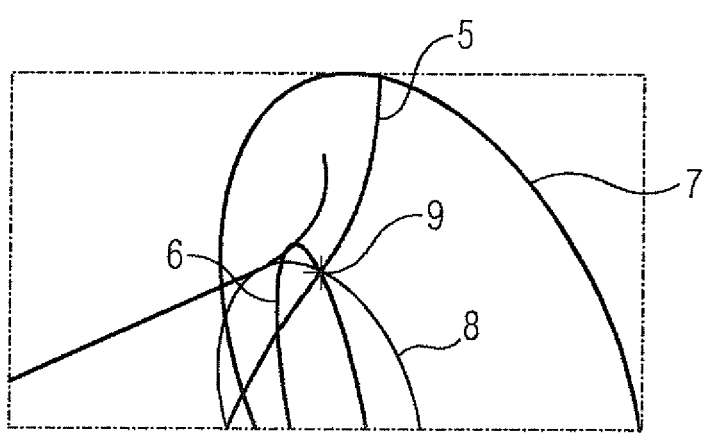
FIG. 5: shows the changes in curvature on the workpiece itself.

It can also be seen from FIG. 4 and FIG. 5 that any given angle between 0° and 180° is possible, depending on path program and path or individual path executed.

Figure 6:
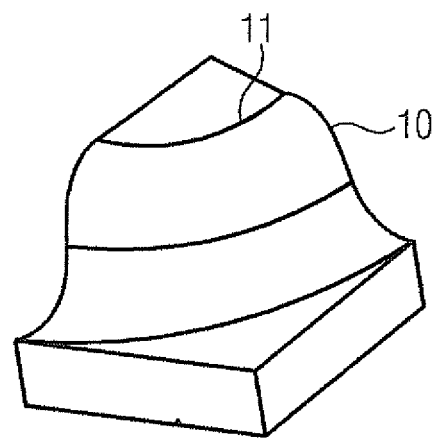
FIG. 6: shows an actual three-dimensional workpiece.
Figure 7:
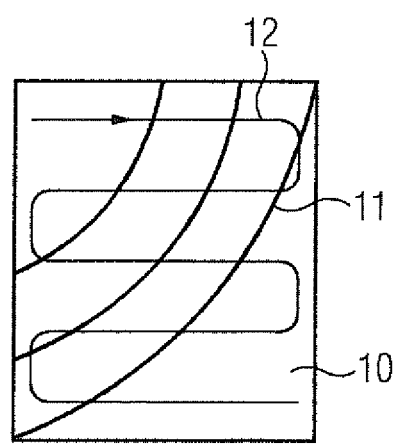
FIG. 7: shows the zig-zag shaped milling path 12 for the actual workpiece according to the prior art.
Figure 8:
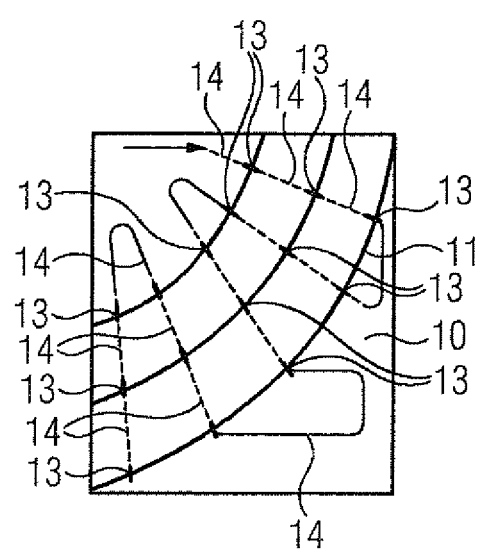
FIG. 8: shows the inventive milling path with preferred individual paths 13 in accordance with the invention.

FIGS. 6-8 shown the invention using a further example. Here the G2 continuity has been selected as the geometric quality criterion.

FIG. 6 shows by way of example a 3-dimensional actual workpiece 10 with edges 11. A machining strategy according to the prior art would generate the zig-zag milling path 12 shown in FIG. 7.

FIG. 8 shows the inventively established preferred directions for individual paths, also referred to below as preferred individual paths 13, for machining. In this case the preferred directions are always at right angles to an edge 11 of the actual workpiece 10. The connecting individual paths 14 connect the respective preferred individual paths 13 in a suitable manner. Curvature jumps during machining of this actual workpiece 10 are not to be avoided however. Through the inventive establishment of the preferred individual paths 13 the connecting individual paths 14/preferred individual paths 13 at least have the same curvature characteristic. This produces a similar milled profile.

The invention claimed is:

1. A control method for the movement of a tool with a machine tool, the machine tool being controlled by a control device, in order to produce an arbitrary required surface of a workpiece by machining, comprising:
creating a numeric path program which describes the machining of the workpiece with the tool at machining points and which controls the control device;
producing by the numeric path program a path with respect to the geometric nature of the surface of the workpiece to be machined, the path consisting of a plurality of sample points and individual paths, each individual path connecting a pair of these sample points to each other, and the path comprising different individual paths;
evaluating each individual path according to a geometric quality criterion;
selecting the individual paths, which have a preferred direction, according to the geometric quality criterion;
selecting the path according to the preferred directions of the individual paths;
calculating, evaluating and selecting by a combination tool the numeric path program for the control of the machine tool on the basis of the geometric quality criterion, the geometric quality criterion comprising a suitable combination of curvature continuity, tangency continuity and characteristics of the machine tool;
producing the path; and
controlling the machine tool to produce the required surface of the workpiece in accordance with the produced path,
wherein the characteristics of the machine tool includes different dynamic capabilities of individual machine axes.

2. The control method of claim 1, wherein a plurality of path programs is produced for the arbitrary required surface and are evaluated and selected with respect to the geometric quality criterion.

3. The control method of claim 1, wherein the machine tool is a cutting machine tool, in particular a milling machine.

4. A control device for the movement of a tool with a machine tool, the machine tool being controlled by a control device, in order to produce an arbitrary required surface of a workpiece by machining, the control device comprising a numerically controlled machine tool configured to:

create a numeric path program which describes the machining of the workpiece with the tool at machining points and which controls the control device;

produce by the numeric path program a path with respect to the geometric nature of the surface of the workpiece to be machined, the path consisting of a plurality of sample points and individual paths, each Individual path connecting a pair of these sample points to each other, and the path comprising different individual paths;

evaluate each individual path according to a geometric quality criterion;

select the individual paths, which have a preferred direction, according to the geometric quality criterion;

calculate, evaluate and select by a combination tool the numeric path program for the control of the machine tool on the basis of the geometric quality criterion, the geometric quality criterion comprising a suitable combination of curvature continuity, tangency continuity and characteristics of the machine tool;

produce the path; and control the machine tool to produce the required surface of the workpiece in accordance with the produced path, wherein the characteristics of the machine tool includes different dynamic capabilities of individual machine axes.

5. The control device of claim 4, wherein a plurality of path programs is produced for the arbitrary required surface and are evaluated and selected with respect to the geometric quality criterion.

6. The control device of claim 4, wherein the machine tool is a cutting machine tool.

7. The control device of claim 4, wherein the machine tool is a milling machine.

\* \* \* \* \*